United States Patent
Joo

(10) Patent No.: US 6,836,211 B2
(45) Date of Patent: Dec. 28, 2004

(54) RESCUE REQUESTING METHOD IN BLUETOOTH SYSTEM

(75) Inventor: Young-Seoung Joo, Seoul (KR)

(73) Assignee: Samsung Electronics Co., Ltd. (KR)

( * ) Notice: Subject to any disclaimer, the term of this patent is extended or adjusted under 35 U.S.C. 154(b) by 83 days.

(21) Appl. No.: 10/100,593

(22) Filed: Mar. 18, 2002

(65) Prior Publication Data

US 2002/0175819 A1 Nov. 28, 2002

(30) Foreign Application Priority Data

May 24, 2001 (KR) .......................................... 2001-26598

(51) Int. Cl.$^7$ .......................... H04Q 7/00; H04M 11/04
(52) U.S. Cl. ............................... 340/539.1; 340/539.11; 455/404.1; 455/422.1
(58) Field of Search .......................... 340/539, 3.1, 7.1, 340/7.5, 7.2, 7.21, 7.3, 7.43, 7.45, 825.69, 825.72; 375/132–134, 219, 220; 370/912, 913; 455/7, 9, 404, 454, 422, 41, 500, 517, 575, 11.1, 13.1

(56) References Cited

U.S. PATENT DOCUMENTS

| | | | | |
|---|---|---|---|---|
| 2002/0012329 A1 | * | 1/2002 | Atkinson et al. | 370/330 |
| 2002/0019584 A1 | * | 2/2002 | Schulze et al. | 600/300 |
| 2002/0019725 A1 | * | 2/2002 | Hoffmann | 198/571 |
| 2002/0094778 A1 | * | 7/2002 | Cannon et al. | 455/41 |
| 2002/0137489 A1 | * | 9/2002 | Dutta et al. | 455/404 |
| 2002/0194500 A1 | * | 12/2002 | Bajikar | 713/201 |
| 2003/0073424 A1 | * | 4/2003 | Nunally | 455/404 |

* cited by examiner

*Primary Examiner*—Donnie L. Crosland
(74) *Attorney, Agent, or Firm*—Dilworth & Barrese, LLP

(57) ABSTRACT

There is provided a rescue requesting method using Bluetooth™ wireless communication technology. One of a plurality of Bluetooth™ devices that form a network generates a message packet requesting an emergency rescue in an emergency and transmits the message packet to the other Bluetooth™ devices in the network. A Bluetooth™ device receiving the message packet performs a predetermined rescue request operation in response to the message packet.

7 Claims, 5 Drawing Sheets

RESCUE REQUESTING METHOD IN BLUETOOTH SYSTEM

PRIORITY

This application claims priority to an application entitled "Rescue Requesting Method in Bluetooth™ System" filed in the Korean Industrial Property Office on May 24, 2001 and assigned Serial No. 2001-28598, the contents of which are hereby incorporated by reference.

BACKGROUND OF THE INVENTION

1. Field of the Invention

The present invention relates generally to a rescue requesting method, and in particular, to a rescue requesting method using Bluetooth™ wireless communication technology.

2. Description of the Related Art

Along with the development of wireless communication technology, most people have at least one wireless communication terminal. Because these wireless communication terminals enable communications anywhere anytime, they are widely used, for example, for voice calls and data communication. Especially, the portability of the wireless communication terminals makes them useful for help in emergencies, namely, the implementation of an emergency "911" call.

Traditionally, in case of an emergency, a caller requests rescue by pressing a single hot key button or some buttons in a predetermined order on his wireless communication terminal. The terminal then automatically dials the other party (e.g., police or a fire rescue team) and transmits a rescue request message to the other party. Though the emergency rescue operation must be done very fast in view of its nature, the conventional rescue method requires a basic call set-up and involves a delay in the rescue operation when the emergency caller is remote from the other party even if the emergency call is set up and the rescue request is successfully responded. Therefore, there is a pressing need for a more simple, faster rescue requesting method.

SUMMARY OF THE INVENTION

It is, therefore, an object of the present invention to provide a method of requesting rescue using a Bluetooth™-enabled wireless communication terminal.

It is another object of the present invention to provide a method of requesting rescue to other Bluetooth™-enabled wireless communication terminals within the same piconet by a Bluetooth™-enabled wireless communication terminal.

The foregoing and other objects of the present invention are achieved by providing a rescue requesting method using Bluetooth™ wireless communication technology. One of a plurality of Bluetooth™ devices that form a network generates a message packet requesting an emergency rescue in an emergency and transmits the message packet to the other Bluetooth™ devices in the network. A Bluetooth™ device receiving the message packet performs a predetermined rescue request operation in response of the message packet.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described hereinbelow with reference to the accompanying drawings. In the following description, well-known functions or constructions are not described in detail since they would obscure the invention in unnecessary detail.

The present invention is applied to all types of Bluetooth™-enabled devices. Before describing the structure and operation of the present invention, a description will be first made on the Bluetooth™ communication technology.

As known, Bluetooth™ is a short-range wireless connectivity technology. The Bluetooth™ technology enables communications at a high radio frequency of 2.4 GHz even against obstacles and offers a data rate of 1 to 10 Mbps. When Bluetooth™-equipped devices come within a 10 to 100 meters range of each other, they can establish a connection with each other, which is advantageous as compared to infrared communication (IrDA). Moreover, Bluetooth™ allows high rate data transmission with low power and ensures data transmission security. For these reasons, interest in Bluetooth™ is soaring.

Bluetooth™ provides point-to-point or point-to-multipoint connection. In a point-to-multipoint connection, a plurality of Bluetooth™-enabled devices (hereinafter, referred to as Bluetooth™ devices) share the same channel. Two or more Bluetooth™ devices sharing the same channel form a piconet, and one Bluetooth™ device initiating communication in the piconet operates as a master and the other Bluetooth™ devices operate as slaves. The master controls channel access from the slaves. A plurality of piconets with overlapped service areas form a scatternet. A master in a piconet may become a slave in another piconet.

Figure 1:
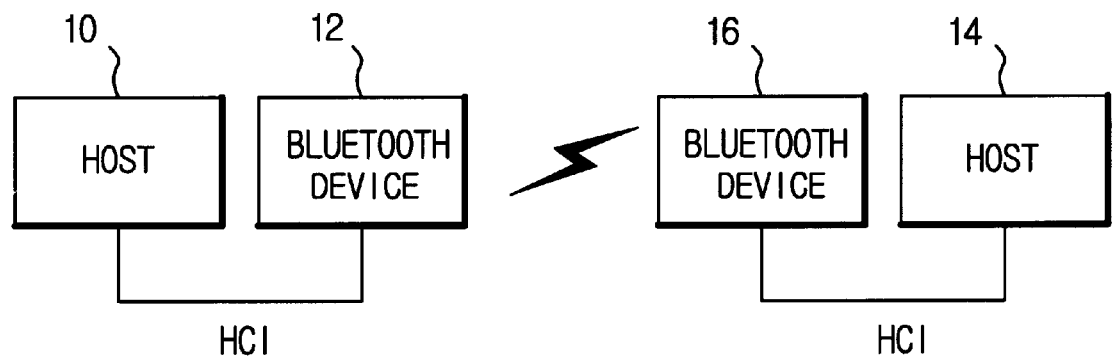
FIG. 1 is a schematic block diagram of a Bluetooth™ system to which the present invention is applied.

FIG. 1 is a schematic block diagram of a Bluetooth™ system to which the present invention is applied. Referring to FIG. 1, hosts 10 and 14 are main bodies for communications and Bluetooth™ devices 12 and 16 enable communications according to the Bluetooth™ standards in compliance with requests from the hosts 10 and 14. An interface HCI (Host Control Interface) is defined between the hosts 10 and 14 and the Bluetooth™ devices 12 and 16 and controls commands, command-related results, and user data that are exchanged by exchanging corresponding messages (HCI packets). USB (Universal System Bus) and standard PC interfaces as well as RS232 can be used as the HCI. HCI packets are divided into command, event and data packets. Command packets provide 60 or so commands according to the standard specification to utilize Bluetooth™ devices for wide usage.

Figure 2:
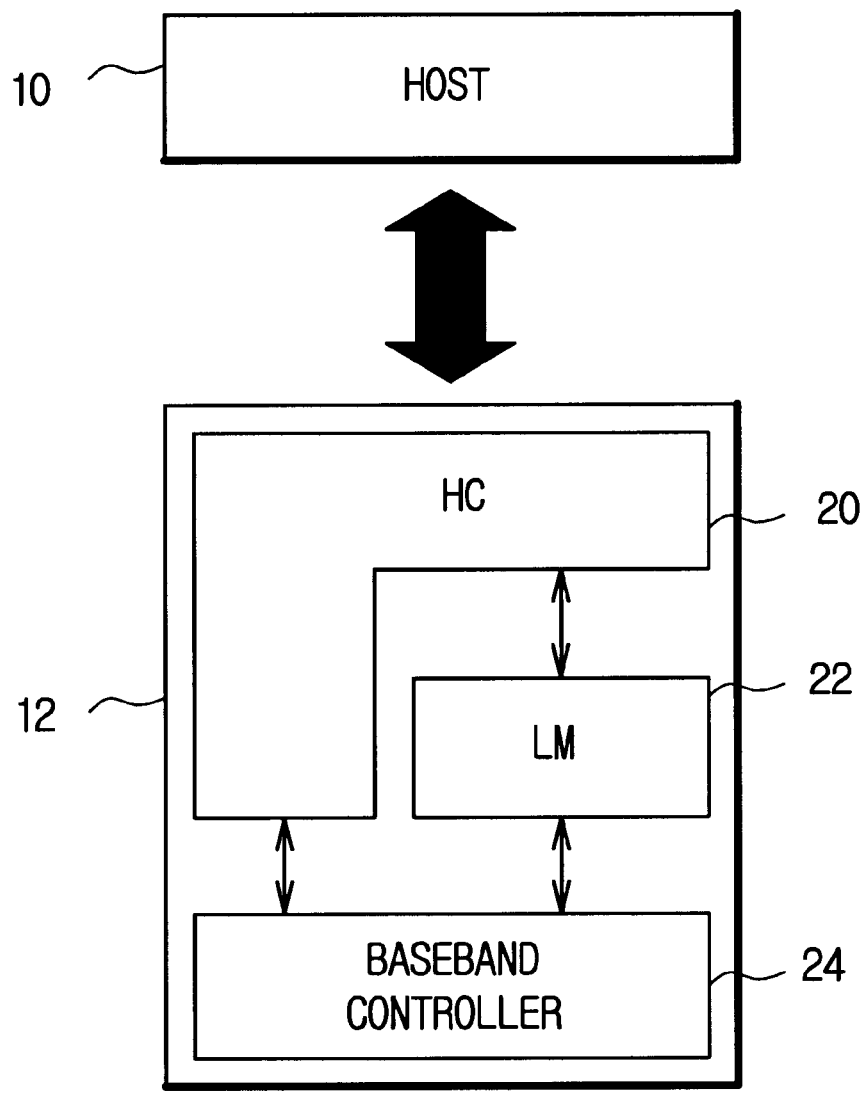
FIG. 2 is a functional block diagram of the Bluetooth™ device shown in FIG. 1.

FIG. 2 is a functional block diagram of the Bluetooth™ device 12 or 16. Referring to FIG. 2, the Bluetooth™ device 12 includes an HC (Host Controller) 20 for taking charge of the HCI, an LM (Link Manager) 22 for processing messages exchanged between the Bluetooth™ device and another Bluetooth™ device at a link level, and a baseband controller 24.

Before establishing a connection for communication, the thus-constituted Bluetooth™ device performs an inquiry procedure to detect and collect the unique addresses and clock signals of Bluetooth™ devices within a predetermined range, and then performs a paging procedure for a connection for data transmission. Though a Bluetooth™ device generating a piconet is a master in principle, master-slave switching can be done if a slave is to transmit data actively. This operation is performed when a host orders its Bluetooth™ device to initiate an inquiry, paging, or master-slave switch by an HCI command. The HC 20/LM 22 actually takes charge of the inquiry, paging, or master-slave switching and the result is reported to the host 10 as an HCI event.

In the process of the inquiry, paging, or master-slave switching, parameters related with the Bluetooth™ device, namely the address and clock signal of the transmitting Bluetooth™ device are transmitted to a Bluetooth™ device on the receiving side by FHS (Frequency Hopping Synchronous) packets.

Figure 3:
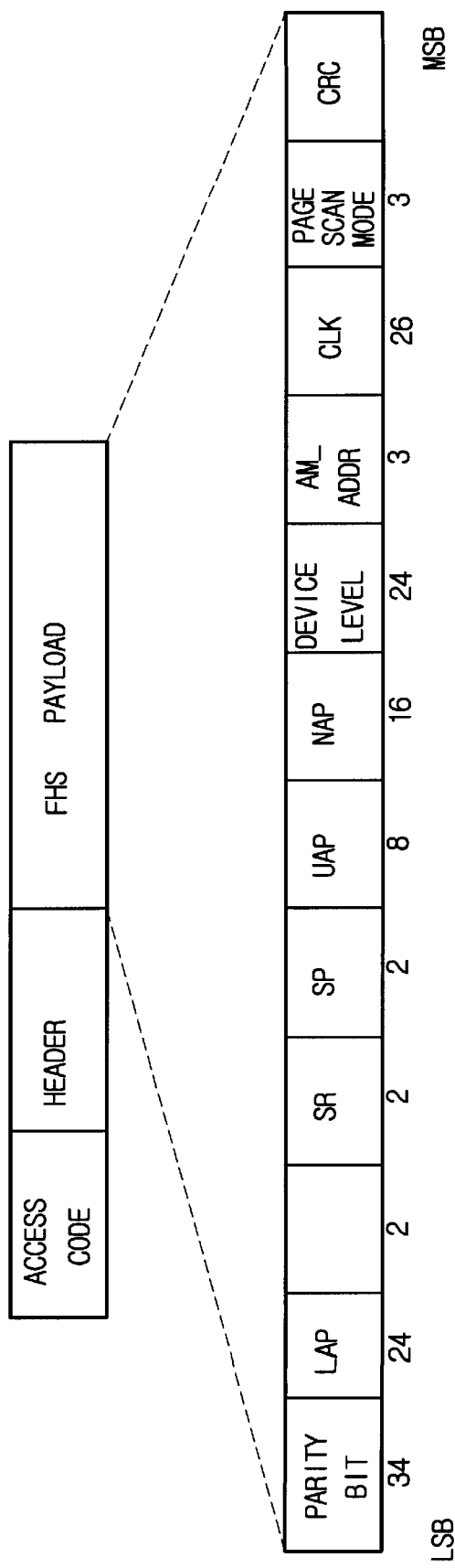
FIG. 3 illustrates the format of an FHS (Frequency Hopping Synchronous) packet.

FIG. 3 illustrates the format of an FHS packet. Referring to FIG. 3, the FHS packet is comprised of a 72-bit access code, a 54-bit header, and a 240-bit FHS payload.

The FHS payload includes 34 parity bits, a 24-bit LAP (Lower Address Part) for an FHS packet transmitting device, a 2-bit non-defined field, a 2-bit SR (Scan Repetition) for providing an interval between consecutive paging scan windows, a 2-bit SP (Scan Period) for identifying a period in a mandatory page scan mode, an 8-bit UAP (Upper Address Part) for the FHS packet transmitting device, a 16-bit NAP (Non-Significant Address Part), a 24-bit device level field indicating the level of the FHS packet transmitting device, a 3-bit AM-ADDR (Active Member Address) indicating the member address of a receiver in a piconet, a 26-bit clock indicating the current value of the system clock of the FHS packet transmitting device, a 3-bit page scan mode field that indicates a scan mode as a default for the FHS packet transmitting device, and a 16-bit CRC for error correction. The LAP, UAP and NAP fields form a Bluetooth™ device address (BD_ADDR).

According to a feature of the present invention, the thus-constituted Bluetooth™ device requests a rescue to another Bluetooth™ device using an FHS packet, particularly using the $59^{th}$ or $60^{th}$ bit or both bits of the non-defined 2-bit field. For this purpose, a wireless communication terminal equipped with a Bluetooth™ device has a hot key button or a plurality of buttons which are pressed in a predetermined order to invoke a rescue request program.

When a caller presses a hot key button or predetermined buttons to request emergency rescue, the host 10 senses the emergency and transmits an HCI command to order the Bluetooth™ device 12 to transmit an FHS packet as a stored rescue request program is executed. The Bluetooth™ device 12 writes a rescue request value, for example '11' in the $59^{th}$ and $60^{th}$ bits of the FHS packet and transmits the FHS packet to the Bluetooth™ device 16 through the air interface. In the present invention, the $59^{th}$ and $60^{th}$ bits of an FHS packet are defined as a rescue request field.

Upon receipt of the FHS packet, the Bluetooth™ device 16 detects the rescue request field and transmits the result to the host 14. If the rescue request field indicates an emergency rescue request, that is, it is set to '11', the host 14 performs a predetermined rescue request notification operation which can be manufacturer- or user-defined vibrations, bell sounds, or character display, for example. Alternatively, if a wired or wireless network connection is available to the Bluetooth™ device 16, the Bluetooth™ device 16 automatically connects a call to a predetermined agency such as a police station or a fire house and transmits related information (e.g., ID) of the Bluetooth™ device 12. If possible, the Bluetooth™ device 16 may transmit the information of the Bluetooth™ device 12 to communicable neighbor Bluetooth™ devices.

Now, there will be given a description of embodiments of FHS packet transmission from the Bluetooth™ device 12.

A Remote Name Request message is used in the first embodiment of FHS packet transmission. The Bluetooth™ system provides the remote name request procedure as a rescue service implemented without a connection request. In this procedure, a Bluetooth™ device that intends to request a name transmits an FHS packet to another corresponding Bluetooth™ device.

Figure 4:
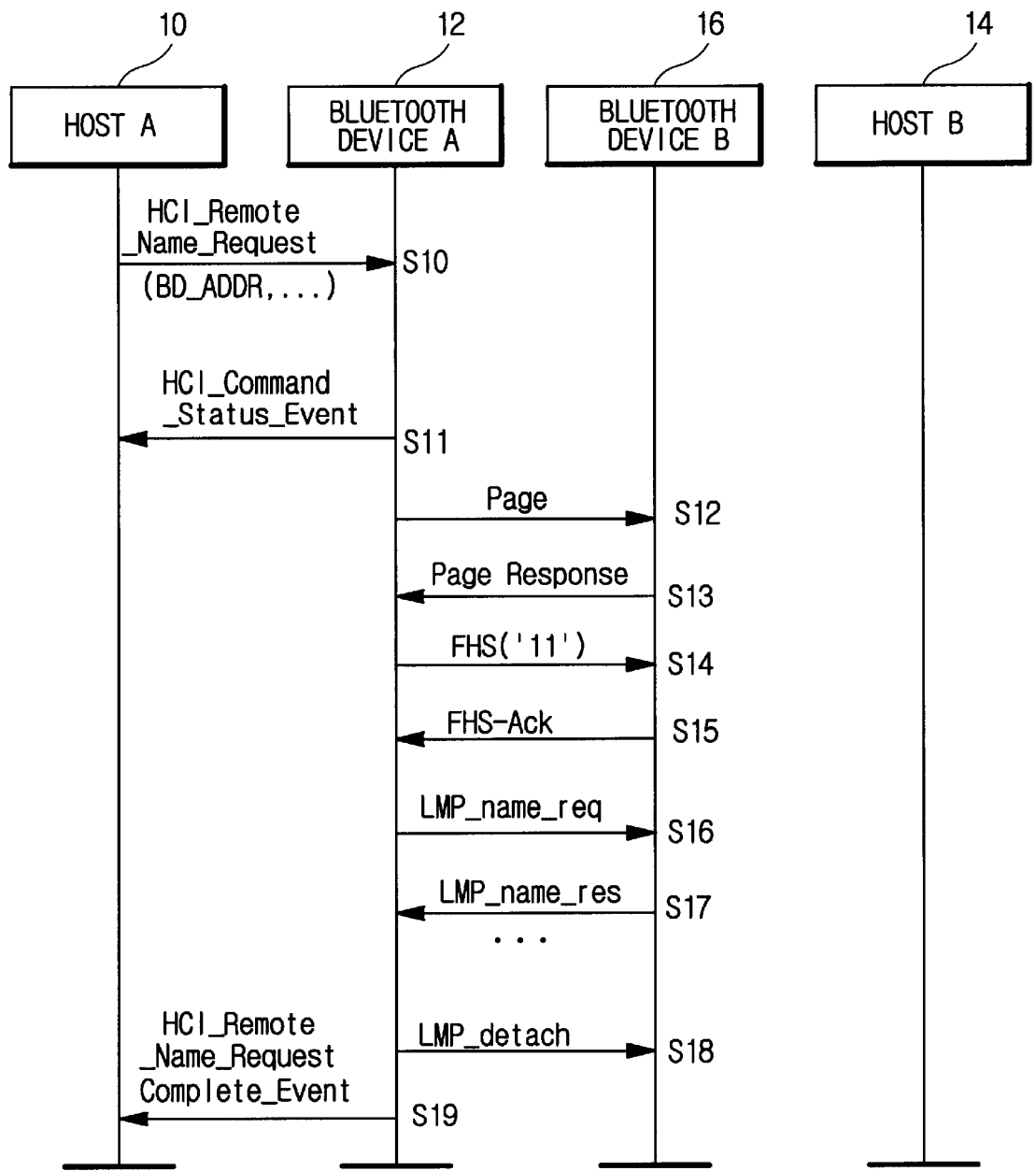
FIG. 4 is a diagram showing a message flow for transmission of a rescue FHS packet in a remote name request procedure according to an embodiment of the present invention.

FIG. 4 illustrates a message flow for transmission of an FHS packet in a remote name request procedure according to the first embodiment of the present invention. One of Bluetooth™ functionalities is to find out the name of another Bluetooth™ device in a perceivable form to man. It is easier for a user that cannot understand the 6-bit address (BD_ADDR) of a Bluetooth™ device to establish a connection to the Bluetooth™ device by its name instead of its address. Therefore, Bluetooth™ communication usually involves detection of the name as well as the address of a Bluetooth™ device, and a user is likely to know the names of Bluetooth™ devices whose addresses are detected to make sure they are an intended Bluetooth™ device.

Referring to FIG. 4, the host 10 (host A) that is to request a rescue transmits a remote name request command, HCI_Remote_Name_Request, to the Bluetooth™ device 12 (Bluetooth™ A) in step S10. The command HCI_Remote_Name_Request includes the address BD_ADDR of a Bluetooth™ device of which the name the host 10 wants to know. In response to the command, the Bluetooth™ device 12 transmits a command responding event, HCI_Command_Status_Event, to the host 10 in step S11 and transmits a paging message Page to the Bluetooth™ device 16 (Bluetooth™ device B) on the other side in order to automatically establish a link in step S12. After the paging message is transmitted in a transmission slot, a response in a reception slot is awaited from the Bluetooth™ device 16 on the other side.

Upon receipt of a response, Page Response, for the paging message, Page, in a reception slot from the Bluetooth™ device 16 in step S13, the Bluetooth™ device 12 transmits an FHS packet to the Bluetooth™ device 16 in order to request emergency rescue in step S14, considering that the Bluetooth™ device 16 has successfully been paged. The $59^{th}$ and/or $60^{th}$ bit(s) of the FHS packet are/is set to a predetermined value, for example, '11'.

Upon receipt of FHS-Ack as a response for the FHS packet in step S15, the Bluetooth™ device 12 transmits a name request message, LMP_name_req, to the Bluetooth™ device 16 according to an LMP (Link Manager Protocol) in step S16. Upon receipt of LMP_name_res including information about the name of the Bluetooth™ device 16 as many times as the length of the name in step S17, the Bluetooth™ device 12 releases the link by transmitting LMP-detach to the Bluetooth™ 16 in step S18 and ends the remote name request procedure by transmitting HCI_Remote_Name_Request_Complete_Event including the name of the Bluetooth™ device 16 to the host 10 in step S19.

The Bluetooth™ device 16, which received the FHS packet indicating an emergency rescue request in step S14, detects the $59^{th}$ and $60^{th}$ bits of the FHS packet and reports the result to the host 14 (host B). The host 14 executes a predetermined rescue notification operation according to the result. As stated above, the rescue request can be notified in the form of vibrations, bell sounds, a character display, or an emergency rescue request to a different third Bluetooth™device.

Master-slave switching can be utilized for FHS packet transmission in a second embodiment of the present invention wherein a slave that is to be a master transmits an FHS packet to a master during master-slave switching.

Figure 5:
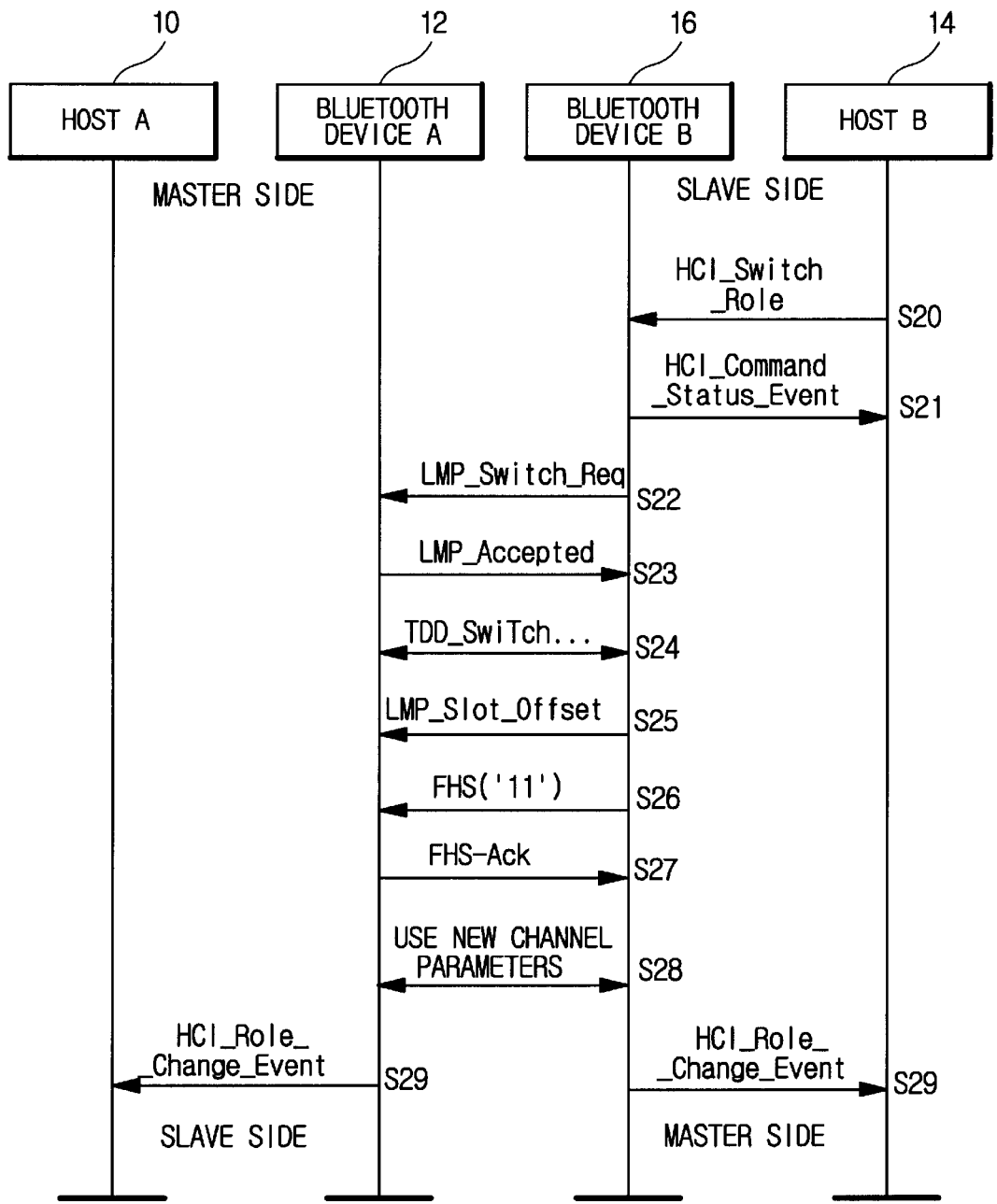
FIG. 5 is a diagram showing a message flow for transmission of a rescue FHS packet in a Master-Slave Switching procedure according to another embodiment of the present invention.

FIG. 5 illustrates a message flow for FHS packet transmission in a master-slave switching procedure according to second embodiment of the present invention.

Referring to FIG. 5, the host 14 (host B) on a slave side transmits a master-slave switching command, HCI_Switch_Role, to its Bluetooth™ device 16 (Bluetooth™ device B) in step S20. In response to the command, the Bluetooth™ device 16 transmits HCI_Command_Status_Event to the host 14 in step S21 and transmits a switching request message LMP_switch_req to the Bluetooth™ device 12 (Bluetooth™ device A) on a master side in step S22. After transmitting the switching request message in a transmission slot, the Bluetooth™ device 16 awaits a response from the Bluetooth™ device 12 in a reception slot.

When the Bluetooth™ device 16 receives a response LMP_accepted for the switching request message in a reception slot from the Bluetooth™ device 12 in step S23, the Bluetooth™ device 16 and the Bluetooth™ device 12 identify each other and perform TDD (Time Division Duplex)-switching by exchanging the transmission slot with the reception slot in step S24. However, it cannot be said that the switching is completely done and the Bluetooth™ devices 12 and 16 are still using the address and clock signal of the master Bluetooth™ device 12. Since the clock signals of the Bluetooth™ devices 12 and 16 are not synchronized, the Bluetooth™ device 16 transmits LMP_slot_offset including a clock offset to the Bluetooth™ device 12 so that the Bluetooth™ device 12 is synchronized to the clock signal of the Bluetooth™ device 16 in step S25. After LMP messages for time alignment, the Bluetooth™ device 16 transmits an FHS packet including a new member address AM_ADDR to the Bluetooth™ device 12 in step S26. The $59^{th}$ and/or $60^{th}$ bits(s) of the FHS packet are/is set to a predetermined value, for example, '11'.

When the Bluetooth™ device 16 receives FHS_Ack as a response for the FHS packet in step S27, the Bluetooth™ devices 12 and 16 set new channel parameters in step S28 and end the master-slave switching procedure by transmitting HCI-Role_Change_Event to the hosts 10 and 14, respectively in step S29.

The Bluetooth™ device 12, which received the FHS packet indicating an emergency rescue request in step S26, detects the $59^{th}$ and $60^{th}$ bits of the FHS packet and reports the result to the host 10 (host A). The host 10 executes a predetermined rescue notification operation according to the result. As stated above, the rescue request can be notified in the form of vibrations, bell sounds, a character display, or an emergency rescue request to a different third Bluetooth™ device.

In accordance with the present invention as described above, a Bluetooth™ device user in an emergency can be rescued or receive aid immediately by notifying another Bluetooth™ user of his emergency state.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A rescue requesting method for use in one of a plurality of Bluetooth™ devices that form a network, comprising the steps of:

pressing, by a user, a predetermined hot key button on a mobile phone to invoke a rescue request program;

generating a message packet requesting an emergency rescue in an emergency, wherein the message packet has a value indicating a rescue request in a preset bit position; and transmitting the message packet to the other Bluetooth™ devices in the network.

2. The rescue requesting method of claim 1, wherein the message packet is an FHS (Frequency Hopping Synchronous) packet.

3. The rescue requesting method of claim 2, wherein the FHS packet is transmitted in a remote name request procedure.

4. The rescue requesting method of claim 2, wherein the FHS packet is transmitted in a master-slave switching procedure.

5. A rescue requesting method for use in one of a plurality of Bluetooth™ devices that form a network, comprising the steps of:

receiving a message packet;

determining whether the received message packet is a request for an emergency rescue from another Bluetooth™ device in the network by detecting a value in a preset bit position; and performing a predetermined rescue request operation in response to the message packet.

6. The rescue requesting method of claim 5, wherein the predetermined rescue request operation is at least one of vibration, bell sound, and character display at the receiving Bluetooth™ device.

7. The rescue requesting method of claim 5, further comprising the step of requesting rescue to a predetermined party in response to the message packet.

* * * * *

UNITED STATES PATENT AND TRADEMARK OFFICE
CERTIFICATE OF CORRECTION

PATENT NO. : 6,836,211 B2
DATED : December 28, 2004
INVENTOR(S) : Young-Seoung Joo It is certified that error appears in the above-identified patent and that said Letters Patent is hereby corrected as shown below:

Title page,
Item [30], Foreign Application Priority Data, "2001-26598" should read -- 2001-28598 --

Signed and Sealed this

Third Day of May, 2005

JON W. DUDAS
*Director of the United States Patent and Trademark Office*